US009041767B2

(12) United States Patent
Leviav et al.

(10) Patent No.: US 9,041,767 B2
(45) Date of Patent: *May 26, 2015

(54) METHOD AND SYSTEM FOR ADAPTING A CP LAYOUT ACCORDING TO INTERACTION BETWEEN CONFEREES

(71) Applicant: Polycom, Inc., San Jose, CA (US)

(72) Inventors: Eyal Leviav, Tel Aviv (IL); Niv Wagner, Rechovot (IL); Efrat Be'ery, Petach-Tikva (IL)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/014,146

(22) Filed: Aug. 29, 2013

(65) Prior Publication Data

US 2014/0002585 A1 Jan. 2, 2014

Related U.S. Application Data

(63) Continuation of application No. 12/750,851, filed on Mar. 31, 2010, now Pat. No. 8,542,266, which is a continuation-in-part of application No. 12/683,806, filed on Jan. 7, 2010, now Pat. No. 8,446,454, which is (Continued)

(51) Int. Cl.
*H04N 7/15* (2006.01)
*G06T 11/60* (2006.01)

(52) U.S. Cl.
CPC ............ *H04N 7/15* (2013.01); *H04N 7/152* (2013.01); *G06T 11/60* (2013.01)

(58) Field of Classification Search
CPC .......... H04N 7/15; H04N 7/152; G06T 11/60

USPC ............ 345/535; 348/14.07, 14.08, 14.09, 348/14.11, 14.16, 585; 375/240.24; 382/238

See application file for complete search history.

(56) References Cited

U.S. PATENT DOCUMENTS 5,657,096 A * 8/1997 Lukacs .................... 348/585
5,751,338 A * 5/1998 Ludwig, Jr. ............ 348/14.12
5,990,933 A 11/1999 Ozone et al.

(Continued)

FOREIGN PATENT DOCUMENTS

| CN | 101478642 | 7/2009 |
|---|---|---|
| JP | 2003339037 | 11/2003 |
| WO | 0215556 | 2/2002 |

OTHER PUBLICATIONS

Office Action from Chinese Application No. 201110077748.8, dated Dec. 13, 2012, 9 pages.

*Primary Examiner* — Gerald Gauthier

(74) *Attorney, Agent, or Firm* — Wong, Cabello, Lutsch, Rutherford & Brucculeri, L.L.P.

(57) ABSTRACT

A system and method is disclosed for adapting a continuous presence videoconferencing layout according to interactions between conferees. Using regions of interest found in video images, the arrangement of images of conferees may be dynamically arranged as displayed by endpoints. Arrangements may be responsive to various metrics, including the position of conferees in a room and dominant conferees in the videoconference. Video images may be manipulated as part of the arrangement, including cropping and mirroring the video image. As interactions between conferees change, the layout may be automatically rearranged responsive to the changed interactions.

22 Claims, 7 Drawing Sheets

Related U.S. Application Data a continuation-in-part of application No. 11/751,558, filed on May 21, 2007, now Pat. No. 8,289,371.

(60) Provisional application No. 61/264,310, filed on Nov. 25, 2009.

(56) References Cited

U.S. PATENT DOCUMENTS

| | | | |
|---|---|---|---|
| 6,300,973 B1 | 10/2001 | Feder et al. | |
| 6,744,460 B1 | 6/2004 | Nimri et al. | |
| 6,972,786 B1 * | 12/2005 | Ludwig | 348/14.11 |
| 7,034,860 B2 * | 4/2006 | Lia et al. | 348/14.09 |
| 7,139,015 B2 * | 11/2006 | Eshkoli et al. | 348/14.07 |
| 7,174,365 B1 | 2/2007 | Even et al. | |
| 7,321,384 B1 * | 1/2008 | Wu et al. | 348/14.08 |
| 7,492,387 B2 | 2/2009 | Yang et al. | |
| 7,538,772 B1 * | 5/2009 | Fouladi et al. | 345/535 |
| 7,542,068 B2 | 6/2009 | Eshkoli et al. | |
| 7,612,793 B2 | 11/2009 | Potekhin et al. | |
| 7,720,157 B2 * | 5/2010 | Lia et al. | 375/240.24 |
| 7,800,642 B2 * | 9/2010 | Eshkoli et al. | 348/14.08 |
| 7,924,305 B2 | 4/2011 | Thielman et al. | |
| 7,940,294 B2 | 5/2011 | Wu et al. | |
| 7,990,410 B2 | 8/2011 | Mock et al. | |
| 8,035,679 B2 * | 10/2011 | Eisenberg et al. | 348/14.09 |
| 8,085,290 B2 | 12/2011 | Graham et al. | |
| 8,120,638 B2 | 2/2012 | Kenoyer | |
| 8,125,509 B2 | 2/2012 | Kenoyer | |
| 8,264,519 B2 | 9/2012 | Lunde et al. | |
| 8,289,371 B2 | 10/2012 | Wagner et al. | |
| 8,395,650 B2 | 3/2013 | Graham et al. | |
| 8,436,889 B2 * | 5/2013 | Eleftheriadis et al. | 348/14.09 |
| 2002/0188731 A1 | 12/2002 | Potekhin et al. | |
| 2003/0149724 A1 | 8/2003 | Chang | |
| 2005/0008240 A1 * | 1/2005 | Banerji et al. | 382/238 |
| 2005/0195275 A1 | 9/2005 | Lia et al. | |
| 2005/0254440 A1 | 11/2005 | Sorrell | |
| 2007/0064094 A1 | 3/2007 | Potekhin et al. | |
| 2007/0165106 A1 | 7/2007 | Groves et al. | |
| 2007/0206089 A1 | 9/2007 | Eshkoli et al. | |
| 2007/0273754 A1 | 11/2007 | Cockerton et al. | |
| 2008/0043090 A1 | 2/2008 | Wiener | |
| 2008/0246834 A1 | 10/2008 | Lunde et al. | |
| 2008/0266379 A1 | 10/2008 | Hubenthal et al. | |
| 2008/0291265 A1 * | 11/2008 | Wagner et al. | 348/14.16 |
| 2009/0207844 A1 | 8/2009 | Gaylord | |
| 2010/0134589 A1 | 6/2010 | Zhang et al. | |
| 2011/0090302 A1 * | 4/2011 | Leviav et al. | 348/14.09 |
| 2012/0147130 A1 | 6/2012 | Wagner | |
| 2012/0176467 A1 | 7/2012 | Kenoyer | |
| 2014/0354764 A1 * | 12/2014 | Avni et al. | 348/14.07 |

\* cited by examiner

METHOD AND SYSTEM FOR ADAPTING A CP LAYOUT ACCORDING TO INTERACTION BETWEEN CONFEREES

CROSS-REFERENCE TO RELATED APPLICATIONS

This application is a continuation of U.S. patent application Ser. No. 12/750,851, filed Mar. 31, 2010, which is a continuation-in-part of U.S. patent application Ser. No. 12/683,806, filed Jan. 7, 2010, now U.S. Pat. No. 8,446,454, which is a continuation-in-part of U.S. patent application Ser. No. 11/751,558, filed May 21, 2007, now U.S. Pat. No. 8,289,371, and which claims priority to U.S. Provisional Patent Application Ser. No. 61/264,310, filed Nov. 25, 2009, all of which are incorporated herein by reference in their entirety for all purposes.

TECHNICAL FIELD

The present invention relates to the field of communication, and in particular to methods and systems for video conferencing.

BACKGROUND ART

Videoconferencing enables individuals located remote from each other to have face-to-face meetings on short notice using audio and video telecommunications. A videoconference may involve as few as two sites (point-to-point) or several sites (multi-point). A single participant may be located at a conferencing site or there may be several participants at a site, such as at a conference room. Videoconferencing may also be used to share documents, information, and the like.

Participants in a videoconference interact with participants at other sites via a videoconferencing endpoint. An endpoint is a terminal on a network, capable of providing real-time, two-way audio/visual/data communication with other terminals or with a multipoint control unit (MCU, discussed in more detail below). An endpoint may provide speech only, speech and video, or speech, data and video communications, etc. A videoconferencing endpoint typically comprises a display unit on which video images from one or more remote sites may be displayed. Example endpoints include POLYCOM® VSX® and HDX® series, each available from Polycom, Inc. (POLYCOM, VSX, and HDX are registered trademarks of Polycom, Inc.). The videoconferencing endpoint sends audio, video, and/or data from a local site to the remote site(s) and displays video and/or data received from the remote site(s) on a screen.

Video images displayed on a screen at a videoconferencing endpoint may be arranged in a layout. The layout may include one or more segments for displaying video images. A segment is a portion of the screen of a receiving endpoint that is allocated to a video image received from one of the sites participating in the session. For example, in a videoconference between two participants, a segment may cover the entire display area of the screen of the local endpoint. Another example is a video conference between a local site and multiple other remote sites where the videoconference is conducted in switching mode, such that video from only one other remote site is displayed at the local site at a single time and the displayed remote site may be switched, depending on the dynamics of the conference. In contrast, in a continuous presence (CP) conference, a conferee at a terminal may simultaneously observe several other participants' sites in the conference. Each site may be displayed in a different segment of the layout, where each segment may be the same size or a different size. The choice of the sites displayed and associated with the segments of the layout may vary among different conferees that participate in the same session. In a continuous presence (CP) layout, a received video image from a site may be scaled down or cropped in order to fit a segment size.

An MCU may be used to manage a videoconference. An MCU is a conference controlling entity that may be located in a node of a network, in a terminal, or elsewhere. The MCU may receive and process several media channels, from access ports, according to certain criteria and distributes them to the connected channels via other ports. Examples of MCUs include the MGC-100 and RMX® 2000, available from Polycom Inc. (RMX 2000 is a registered trademark of Polycom, Inc.). Some MCUs are composed of two logical units: a media controller (MC) and a media processor (MP). A more thorough definition of an endpoint and an MCU may be found in the International Telecommunication Union ("ITU") standards, such as but not limited to the H.320, H.324, and H.323 standards. Additional information regarding the ITU standards may be found at the ITU website www.itu.int.

To present a video image within a segment of a screen layout of a receiving endpoint (site), the entire received video image may be manipulated, scaled down and displayed, or a portion of the video image may be cropped by the MCU and displayed. An MCU may crop lines or columns from one or more edges of a received conferee video image in order to fit it to the area of a segment in the layout of the videoconferencing image. Another cropping technique may crop the edges of the received image according to a region of interest in the image, as disclosed in U.S. patent application Ser. No. 11/751,558, the entire contents of which are incorporated herein by reference.

In a videoconferencing session, the size of a segment in a layout may be defined according to a layout selected for the session. For example, in a 2×2 layout each segment may be substantially a quarter of the display, as illustrated in FIG. 1. Layout 100 includes segments 112, 114, 116 and 118. In a 2×2 layout, if five sites are taking part in a session, conferees at each site typically may see the other four sites.

In a CP videoconferencing session, the association between sites and segments may be dynamically changed according to the activity taking part in the conference. In some layouts, one of the segments may be allocated to a current speaker, and other segments may be allocated to other sites, sites that were selected as presented conferees. The current speaker is typically selected according to certain criteria, such as the loudest speaker during a certain percentage of a monitoring period. The other sites (in the other segments) may include the previous speaker, sites with audio energy above the others, certain conferees required by management decisions to be visible, etc.

In the example illustrated in FIG. 1, only three quarters of the area of the display are used—segments 112, 114, and 116—and the fourth quarter 118 is occupied by a background color. Such a situation may occur when only four sites are active and each site sees the other three. Furthermore, segment 116 displays an empty room, while the sites presented in segment 112 and 114 each include a single conferee (conferees 120 and 130). Consequently, during this period of the session only half of the screen area is effectively used and the other half is ineffectively used. The area of segments 116 and segment 118 do not contribute to the conferees' experience and therefore are not exploited in a smart and effective manner.

Furthermore, as may be seen in both segment 112 and 114, a major area of the image is redundant. The video images capture a large portion of the room while the conferees' images 120 and 130 are small and located in a small area. Thus, a significant portion of the display area is wasted on uninteresting areas. Consequently, the area that is captured by the conferees' images is affected and the experience of the conferees viewing the layout of the video conference is not optimal.

Moreover, in some conference sessions, one or more the sites have a single participant, while in other sites there are two or more participants. In currently available layouts, each site receives similar segment sizes and as a result, each participant at a site with a plurality of conferees is displayed over a smaller area than a conferee in a site with less participants, degrading the experience of the viewer.

In some videoconferencing sessions, there may be sites with a plurality of conferees where only one of them is active and does the talking with the other sites. Usually the video camera in this room captures the entire room, with the plurality of conferees, allocating a small screen area to each one of the conferees including the active conferee. In other sessions content (data) may be presented as part of the layout, typically in one of the segments independently from the video images presented in the other segments.

If during a conference call one of the conferees steps far from the camera, that conferee's image will seem smaller and again the experience of the conferees viewing the layout of the video conference is degraded. Likewise, if the conferees at a displayed site leave the room for a certain time and return afterward, the empty room is displayed on the layout during the conferees' absence.

In some known techniques, the viewing conferees at the other sites may manually change the layout viewed at their endpoints to adjust to the dynamics of the conference, but this requires the conferees to stop what they are doing and deal with a layout menu to make such an adjustment.

SUMMARY OF INVENTION

Current methods for arranging segments in a layout of a CP videoconferencing ignore the interaction between conferees that are located in different sites and the conferee viewing the layout. A conferee that looks at the example prior art CP layout 100 of FIG. 1 sees an unnatural view of a conference in which two conferees 120 and 130 are sitting back to back. The effect may be even worse when the two conferees are the dominant conferees in the session and most of the talking is done between them. Such a layout does not reflect a conference between peers.

Adapting and arranging the layout according to the interaction between the presented conferees in the different sites may improve the experience of the viewer of the CP video image that is based on the layout. Adapting and arranging the layout according to the interaction between the different conferees at different sites may provide an experience similar to a real conference in which the conferees look at each other. Further, adapting the layout to interaction between conferees in the same site may improve the experience of the conferees in the other sites that observe a CP video image based on such a layout. For example, a site with a plurality of conferees in which only one is active may be presented in two segments, one that presents the entire group of conferees, and another that presents the active conferee in a bigger size.

FIG. 2 illustrates an example layout 200 of the same videoconferencing session as FIG. 1, wherein the positions of the video images coming from sites B and A have been exchanged in the layout 200 to give a more faithful sensation of the conference. Site B with conferee 130 is presented in segment 112 instead of being presented in segment 114, and the image 120 from site A is presented in segment 114 instead of being presented in segment 112. The new location better reflects the interaction between the two conferees 120 and 130 that are sitting in the rooms. The new arrangement delivers a pleasant feeling when compared to conferees sitting back to back. Furthermore, the arrangement of the layout will firm the viewer's experience that he is also one of the conferees, because the presented conferees in new placement in the layout is such that they are facing the center of the layout as if facing the viewer. In some embodiments, the segment 116 with the video image from site C may also be moved to the center.

Interaction between presented sites may include two or more sites that are dominant in the conference; the placement/relative location of a person or persons in a site; the direction the persons or person are facing; etc. Different techniques may help discover a location of a conferee relative the center of the room. One embodiment of a technique may use information regarding the direction of the conferee's eyes. From observing a plurality of videoconferencing sessions, we found that a conferee located in the left portion of an image typically looks to the right, while a conferee in the right portion looks to the left, with both looking towards the center of the room. (The directions left and right are from the view of the person viewing the image.) In order to determine the interaction between conferees sitting in different sites, an embodiment may process decoded received video images from different sites participating in the session.

Periodically (each decision period), a region of interest (ROI) in each video image may be found and a decision made regarding the relative location of the ROI in each received video image. Based on the results, an MCU in one embodiment may allocate the left segments in a layout to sites in which the conferees are sitting in the left section of the room and right segments to sites in which the conferees are sitting in the right section of the room. As illustrated in FIG. 2, segment 112 is allocated to the site B with the conferee 130, while segment 114 is allocated to site A.

In some embodiments, in which conferees in different sites are sitting in the same relative location (left or right to the center of the room), one or more of the images may be mirrored. Mirroring the image may be done while building the CP layout in some embodiments, for example, by reading the video data from the right edge to the left edge of each row, and writing the video data from left to right from the left edge of the appropriate row in the relevant segment in the CP layout. The location in the layout may be dynamically changed, such as when another site becomes dominant instead of one of the previous dominant sites. Dominant sites may be any two sites that during a certain period of the conference are doing the talking as a dialogue, for example, while the rest of the presented conferees are silent.

Different algorithms may be used for determining the ROI in each site's video image. From time to time, an embodiment may store a single frame from each one of the video images received from the different sites. Each stored frame may be analyzed in order to define an ROI. Embodiments of the algorithm may analyze the hue of areas of the video image, looking for flesh tone colors to define regions in which a conferee is displayed. Such an embodiment may include a bank of flesh tones colors, for use in detecting conferees.

Other embodiments may use motion detection for determining the ROI location. In one embodiment, the motion detector may be based on motion vectors that are associated with compressed video file. Other embodiments of motion detectors may search for areas of change area between consecutive decoded frames.

Other embodiments may use face detection software for determining the location of a face of a conferee. One example of face detection software is the SHORE software from Fraunhofer IIS. SHORE is a highly optimized software library for face and object detection and fine analysis. (SHORE is a trademark of Fraunhofer IIS.) Another such software is the VeriLook SDK from Neurotechnology. Yet another face detection software is the OpenCV originally developed by Intel Corp.

The reader may find additional information on face detection software at www.consortium.ri.cmu.edu/projOmega-.php and www.consortium.ri.cmu.edu/projFace.php. Based on a size and location of a detected face, an embodiment may estimate the location of the ROI relative to the center of the video image.

Another embodiment uses two or more microphones to allow determining the location of the speaker and the ROI of those images in the room by processing the audio energy received from the plurality of microphones, to determine the relative location of a speaker in the room.

In some embodiments, in which a site has a plurality of microphones, the difference in the energy of the audio signal received from each microphone may be used for determining whether one of the conferees is an active conferee while the rest of the conferees in the room are passive or silence. An active conferee may be defined as the conferee that did more than a certain percentage (70-90%, for example) of the talking in the room for a certain period of time (few seconds to few minutes, for example). If an active conferee is defined, an additional video segment may be allocated in which a portion of the video image from that site is presented that is cropped around the active conferee. This segment can be added to the layout in addition to the segment that presents the entire site.

In some embodiments, the decision on the borders of the cropping area around the active conferee may be performed by using a face detector in correlation with analyzing the audio energy received from the plurality of microphones. In other embodiments, instead of allocating two segments to such a site, one for the video image of the entire group of conferees and one to the area cropped around the active conferee, a single segment may be allocated to the active conferee. Further, the active conferee in its separate segment may be processed and placed in the layout facing the center of the layout.

In some embodiments, the ROI detector may reside in the endpoint and the relative location of the ROI may be transmitted with the video image in a proprietary message or header.

In yet another example, an RF tracker may be used in order to define the location of a subscriber in the room. The signal may be received by two or more antennas located in the room that are associated with an endpoint. The received RF signals may be processed by the endpoint and the location may be transmitted with the video image in a proprietary message or header.

In some embodiments, other techniques may be used for defining the interaction between different sites. For example, audio energy indication received from each site may be processed. The process may follow the interaction between the speakers for a period of time. If the interaction is between two sites, the images from the two sites may be placed on an upper row facing each other as in layout 200 images 112 and 114. Those sites may be referred to as dominant sites or dominant conferees. In some embodiments, the dominant sites may be presented in bigger segments.

In some embodiments, other techniques may be used for defining the interaction between different sites, for example, in a videoconferencing session in which content is presented in one of the segments in addition to the segments that are allocated to video images from the different sites. The content may be presented in a segment in the center of the layout while video images from the different sites may be presented around the segment of the content. Each video image in its allocated segment may be manipulated such that its conferees look toward the content. Further, the endpoint that generates the content can be presented on one side of the content while the other sites can be presented on the other side of the content.

In other embodiments, the relative location of the ROI may be defined manually. In such embodiment, a click-and-view function may be used in order to point to the ROI in each site's video image. A reader who wishes to learn more about click-and-view function is invited to read U.S. Pat. No. 7,542,068, which is incorporated herein by reference in its entirety for all purposes. Alternatively, in some embodiments, the interaction between sites may be defined manually by one of the conferees by using the click-and-view function.

These and other aspects of the disclosure will be apparent in view of the attached figures and detailed description. The foregoing summary is not intended to summarize each potential embodiment or every aspect of the present invention, and other features and advantages of the present invention will become apparent upon reading the following detailed description of the embodiments with the accompanying drawings and appended claims. Further, the above-described deficiencies in conventional videoconferencing are not intended to limit the scope of the inventive concepts in any manner, but are presented for illustration only.

Furthermore, although specific embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. References to daemons, drivers, engines, modules, or routines should not be considered as suggesting a limitation of the embodiment to any type of implementation.

Turning now to the figures in which like numerals represent like elements throughout the several views, embodiments, aspects and features of the disclosed systems and methods are described. For convenience, only some elements of the same group may be labeled with numerals. The purpose of the drawings is describe embodiments and not for production or limitation.

Figure 1:
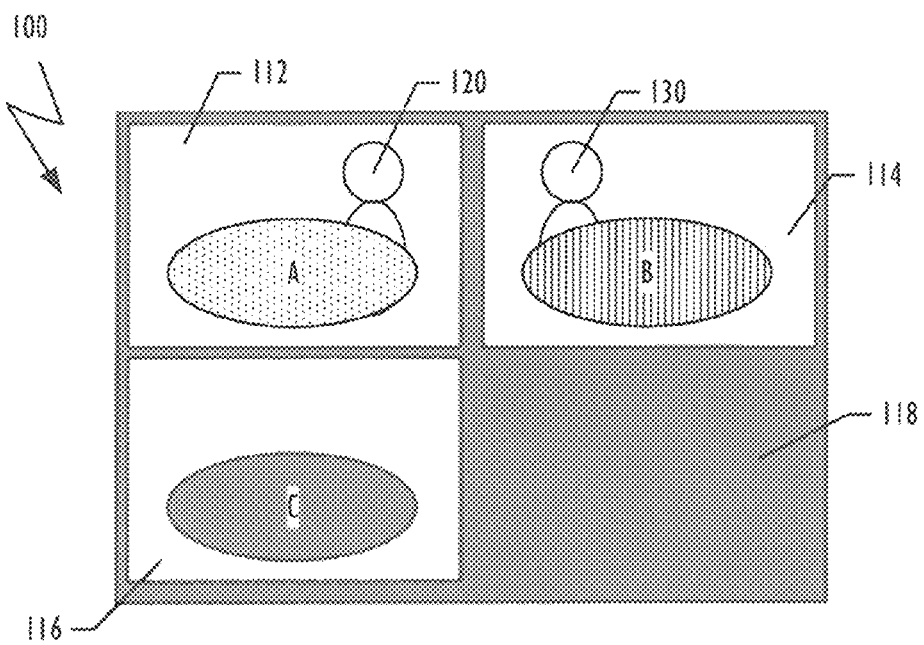
FIG. 1 illustrates an example prior art 2×2 layout displayed.
Figure 2:
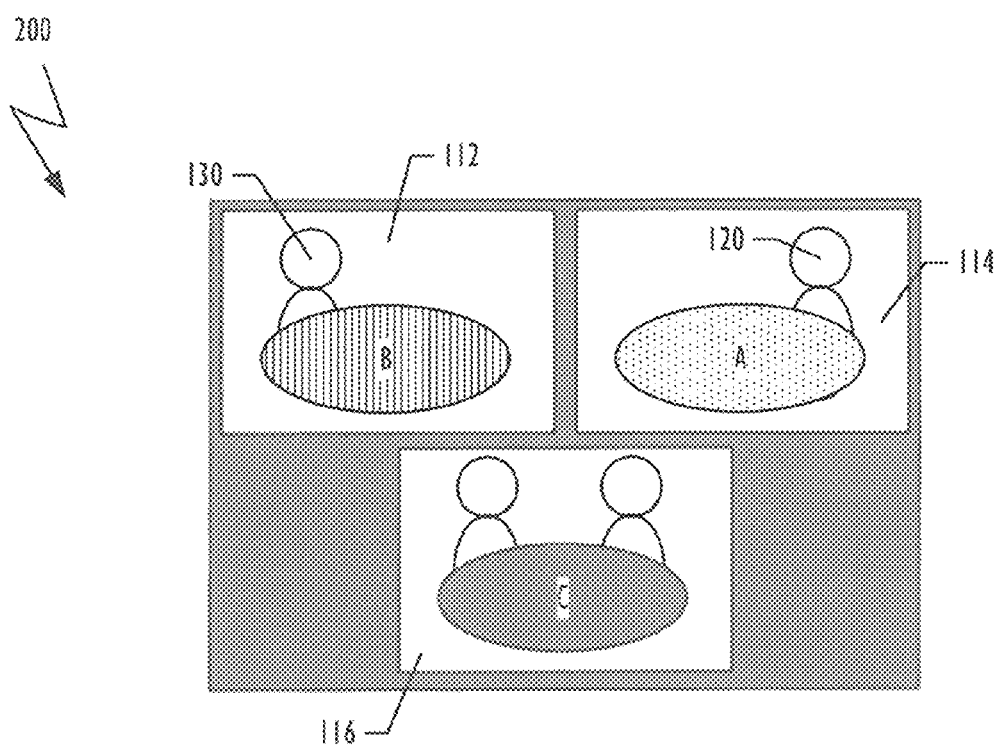
FIG. 2 illustrates an adapted layout according to interaction of participants in different sites, according to one embodiment.
Figure 3:
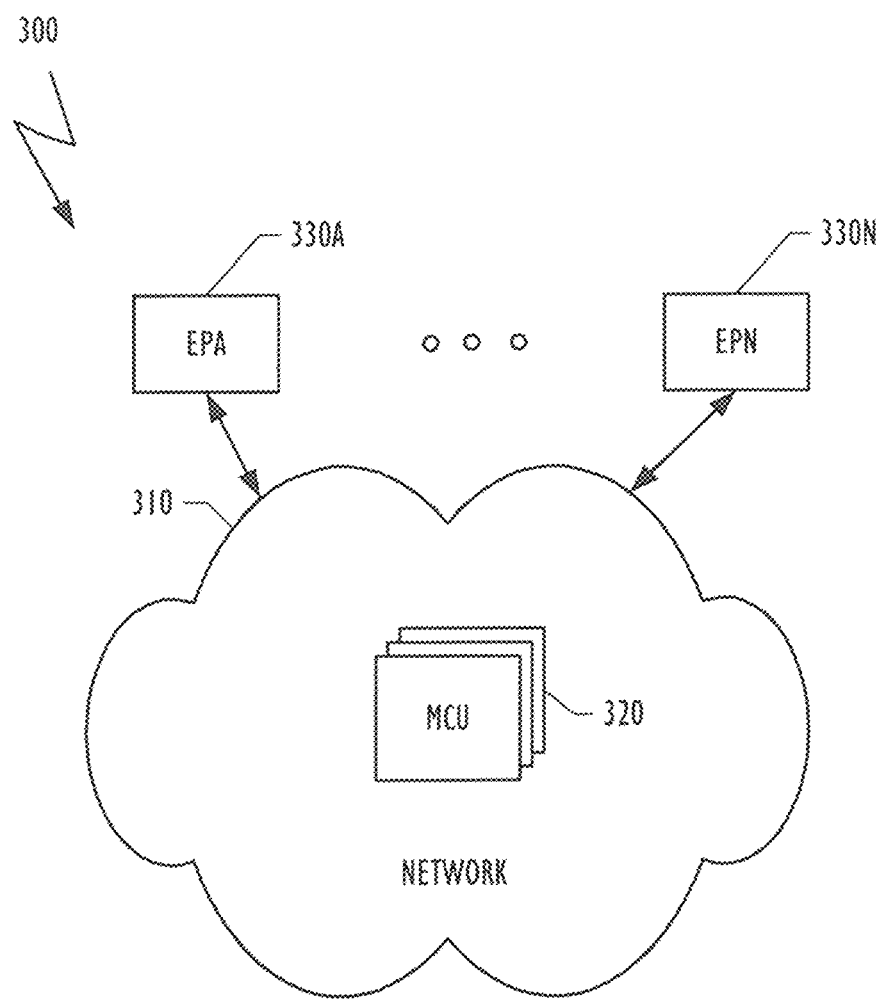
FIG. 3 illustrates a block diagram with relevant elements of an multimedia multipoint conferencing system according to one embodiment.

FIGS. 1 and 2 were described above and will not be further described. FIG. 3 illustrates a block diagram with relevant elements of a portion of a multimedia multipoint conferencing system 300 according to one embodiment. System 300 may include a network 310, connecting one or more MCUs 320, and a plurality of endpoints (sites) 330A-N. In some embodiments in which network 310 includes a plurality of MCUs 320, a virtual MCU may be used for controlling the plurality of MCUs. More information on a virtual MCU may be found in U.S. Pat. No. 7,174,365, which is incorporated herein by reference in its entirety for all purposes. An endpoint 330 (which may be referred to as a terminal) is an entity on the network, capable of providing real-time, two-way audio and/or visual communication with other endpoints 330 or with the MCU 320. An endpoint 330 may be implemented as a computer; a PDA (personal digital assistant); a cell phone; a TV set with a microphone and a camera, etc.

An MCU may be used to manage a videoconference. An MCU is a conference controlling entity that may be located in a node of a network, in a terminal, or elsewhere. The MCU may receive and process several media channels, from access ports, according to certain criteria and distributes them to the connected channels via other ports. Examples of MCUs include the MGC-100 and RMX® 2000, available from Polycom Inc. (RMX 2000 is a registered trademark of Polycom, Inc.). Some MCUs are composed of two logical units: a media controller (MC) and a media processor (MP). A more thorough definition of an endpoint and an MCU may be found in the International Telecommunication Union ("ITU") standards, such as but not limited to the H.320, H.324, and H.323 standards. Additional information regarding the ITU standards may be found at the ITU website www.itu.int.

Network 310 may represent a single network or a combination of two or more networks. The network 310 may be any type of network, including a packet switched network, a circuit switched network, and Integrated Services Digital Network (ISDN) network, the Public Switched Telephone Network (PSTN), an Asynchronous Transfer Mode (ATM) network, the Internet, or an intranet. The multimedia communication over the network may be based on any communication protocol including H.320, H.324, H.323, SIP, etc.

The information communicated between the endpoints (EP) 330A-N and the MCU 320 may include signaling and control, audio information, video information, and/or data. Different combination of endpoints 330A-N may participate in a conference. The endpoints 330A-N may provide speech, data, video, signaling, control, or a combination of them.

An endpoint 330A-N may comprise a remote control (not shown in picture) that may act as an interface between a user in the EP 330 and the MCU 320. The remote control may comprise a dialing keyboard (the keypad of a telephone, for example) that may use DTMF (Dual Tone Multi Frequency) signals, a far end camera control, control packets, etc.

An endpoints 330A-N may also comprise: one or more microphones (not shown in the drawing) to allow users at the endpoint to speak within the conference or contribute to the sounds and noises heard by other users; a camera to allow the endpoints 330A-N to input live video data to the conference; one or more loudspeakers and a display (screen).

The described portion of the system 300 comprises and describes only the most relevant elements. Other sections of a system 300 are not described. It will be appreciated by those skilled in the art that depending upon its configuration and the needs of the system, each system 300 may have other number of endpoints 330, networks 310, and MCUs 320. However, for clarity, one network 310 with a plurality of MCUs 320 is shown.

The MCU 320 and endpoints 330A-N may be adapted to operate according to various embodiments of present disclosure to improve the experience of a conferee looking at a CP video image of a multipoint video conferencing. In embodiments implementing a centralized architecture, the MCU 320 may be adapted to perform the automatic display adaptation techniques described herein. Alternatively, in distributed architecture the endpoints 330A-N as well as the MCU 320 may be adapted to perform the automatic display adaptation techniques. More information about the operation of the MCU 320 and endpoints 330A-N according to different embodiments is disclosed below.

Figure 4:
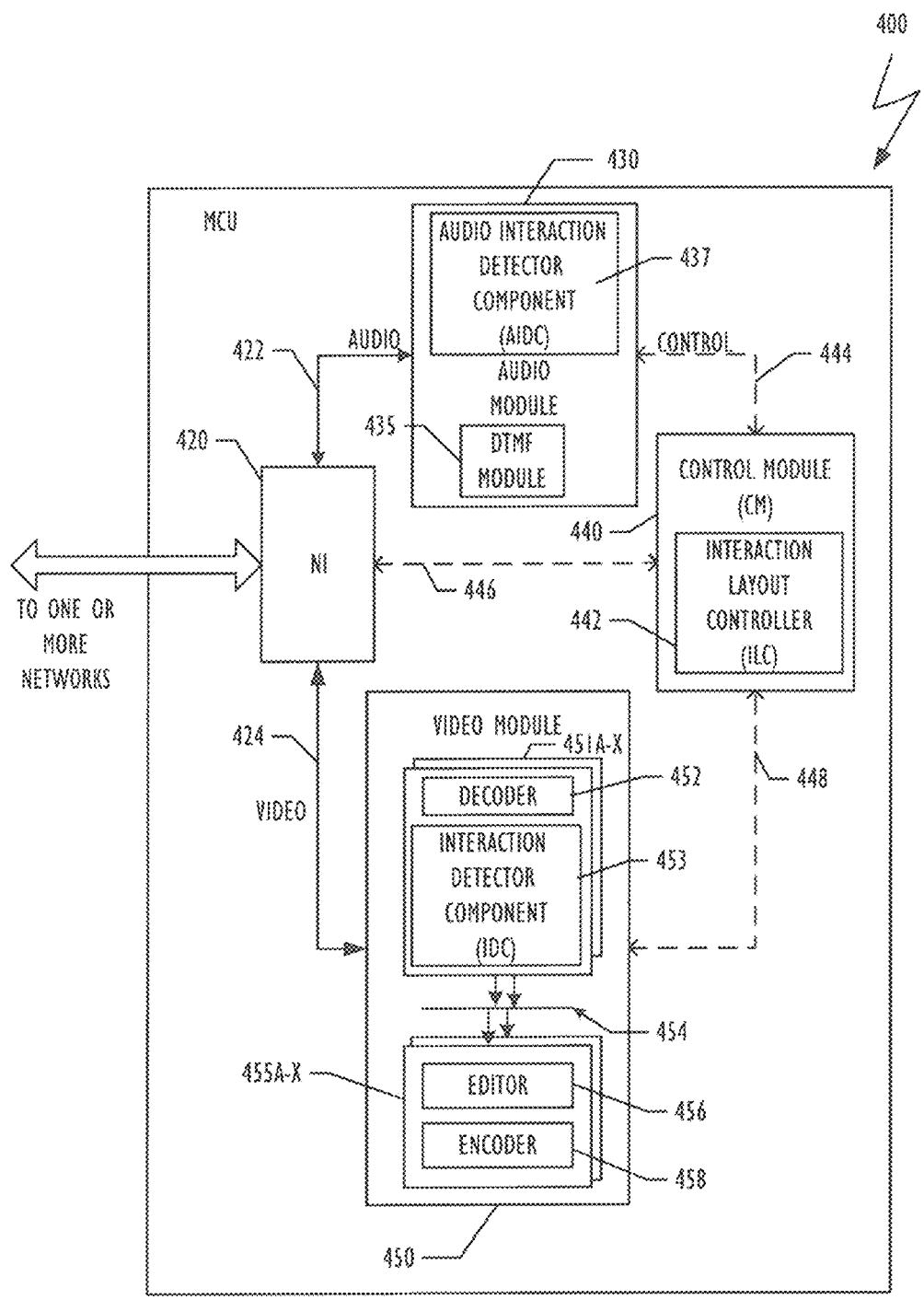
FIG. 4 illustrates relevant elements of an MCU that is capable of dynamically and automatically adapting a CP layout according to the interaction of participants in different sites according to one embodiment.

FIG. 4 illustrates an MCU 400 according to one embodiment. The MCU 400 may include a network interface module (NI) 420, an audio module 430, a control module 440 and a video module 450. Alternative embodiments of the MCU 400 may have other components and/or may not include all of the components shown in FIG. 4. The network interface module 420 may receive communication from a plurality of endpoints 330A-N via networks 310. The NI 420 may process the communication according to one or more communication standards including H.320, H.321, H.323, H.324, Session Initiation Protocol (SIP), etc. Network interface 420 may also process the communication according to one or more compression standards including H.261, H.263, H.264, G.711, G.722, MPEG, etc. Network interface 420 may receive and transmit control and data information to and from other MCUs and endpoints. More information concerning the communication between endpoint and the MCU over network 310 and information describing signaling, control, compression, and setting a video call may be found in the International Telecommunication Union (ITU) standards H.320, H.321, H.323, H.261, H.263, H.264, G.711, G.722, and MPEG etc. or from the IETF Network Working Group website (information about SIP).

The MCU 400 dynamically and automatically adapt a CP layout according to detected interaction between the presented sites. Interactions between presented sites may include two or more sites that are dominant in the conference; the placement of a person or persons in a site; the direction the person or person are facing; etc.

Network interface module 420 may multiplex and de-multiplex the different signals, media and/or "signaling and control" that are communicated between the endpoints 330A-N and the MCU 320. The compressed audio signal may be transferred to and from the audio module 430. The compressed video signal may be transferred to and from the video module 450. The "control and signaling" signals may be transferred to and from control module 440. Furthermore, if a distributed architecture is used, network interface module 420 may be capable of handling automatic and dynamic CP layout adaptation related information that is transferred between the control module 440 and the endpoints 330A-N.

In an embodiment in which the dynamic CP layout adaptation information is sent as a part of a predefined header of a payload of an RTP (Real-time Transport Protocol) packet, NI 420 may be adapted to: process the predefined header to add the automatic and dynamic CP layout adaptation information to the RTP packet and to send the RTP packet toward the endpoints 330A-N, etc. In an embodiment, some of the dynamic CP layout adaptation information may include a request from an endpoint regarding the layout displayed at the endpoint display. In alternate embodiments, the dynamic CP layout adaptation information may be sent via a Far End Camera Control (FECC) channel (not shown in FIG. 4), or it may be sent as payload of dedicated packets that comply with a proprietary protocol. In yet another embodiment, the dynamic CP layout adaptation information may be detected and sent by MCU internal modules. The dynamic CP layout adaptation information may include the ROI (region of interest), the direction the ROI is facing, the relative location of the ROI compared to the center of the video image, and/or interaction between sites, etc.

The Audio module 430 may receive, via NI 420 and through an audio line 422, compressed audio streams from the plurality of endpoints 330A-N. The audio module 430 may process the received compressed audio streams. The audio module 430 may decompress, decode, and mix relevant audio streams from the received audio streams. The audio module 430 may encode, compress, and transfer the compressed encoded mixed signal via the audio line 422 and the NI 420, to one or more endpoints 330A-N.

Audio module 430 may receive, via network interface 420 compressed audio streams from the plurality of endpoint 330A-N. The audio module 430 may decode the compressed audio streams, analyze the decoded streams, select certain streams, and mix the selected streams. The mixed stream may be compressed and the compressed audio stream may be sent to the network interface 420, which sends the compressed audio streams to the different endpoints 330A-N. Audio streams that are sent to different endpoints may be different. For example, the audio stream may be formatted according to a different communication standard and according to the needs of the individual endpoint. The Audio stream may not include the voice of the conferee associated with the endpoint to which the audio stream is sent. However, the voice of this conferee may be included in all other audio streams.

In an embodiment, the audio module 430 may include at least one DTMF module 435. The DTMF module 435 may detect and/or grab DTMF (Dual Tone Multi Frequency) signals from the received audio streams. The DTMF module 435 may convert DTMF signals into DTMF control data. DTMF module 435 may transfer the DTMF control data via a control line 444 to a control module 440. The DTMF control data may be used for controlling the conference using an interactive interface such as but not limited to Interactive Voice Response (IVR). In other embodiments, DTMF control data may be used via a click and view function. Other embodiments of the present invention may use a speech recognition module (not shown) in addition to, or instead of, the DTMF module 435. In these embodiments, the speech recognition module may use a conferee's vocal commands for controlling parameters of the videoconference.

Audio module 430 may be further adapted to analyze the received audio signals from the endpoints and determine the energy of each audio signal. Information on the signal energy may be transferred to the control module 440 via control line 444. In some embodiments, two or more microphones may be used in a certain site. In such embodiment, the audio module 430 may comprise an Audio Interaction Detector Component (AIDC) 437. The energy from each microphone may be transferred to AIDC 437 and be used for determining the region of interest (ROI) placement and/or the relative location of an ROI in a certain site. In some embodiments, the energy level may be used as a selection parameter for selecting appropriate one or more endpoints as the audio source to be mixed in the videoconference. The endpoints may be referred to as selected endpoints or presented endpoints. In other embodiments of a distributed architecture, an endpoint 330A-N may have some of the functionality of the audio module 430.

In addition to common operations of a typical MCU, MCU 400 is capable of additional operations as result of having the control module (CM) 440. The control module 440 may control the operation of the MCU 400 and the operation of its internal modules. Modules such as, but not limited to: the audio module, a video module 450, etc. The control module 440 may include logic modules that may process instructions received from the different internal modules of the MCU 400. An embodiment of the control module 440 may process instructions received from the DTMF module 435 via the control line 444. The control signals may be sent and received via control lines: 444, 446, and/or 448. Control signals such as but not limited to commands received from a participant via a click and view function; detected status information from the video module 450; etc.

The Control module 440 may be a logical unit that controls the operation of the MCU 400. In addition to common operation of a typical MCU, the MCU 400 may be capable of additional functionality as result of having the control module 440. Control module 440 may include an Interaction Layout Controller (ILC) 442 that adapts the layout that will be displayed in each site. The ILC 442 may receive information and updates from the NI 420, including the number of sites that will participate in the conference call, which sites have departed, which sites have left the conference, which sites have been joined the conference, etc. Other type of information may include commands regarding the layout that one or more participant request, etc.

In one embodiment, the ILC 422 may determine and/control the layout to be displayed in one or more of the endpoints 330A-N. The ILC 442 may receive control information from the endpoints 330A-N via the NI 420 and or the DTMF 435. The ILC 442 may also receive detected information from MCU 400 internal units, including the audio module 430, the video module 450, the relative location of the ROI in the different video images. According to the different information and control information, the ILC 442 may determine how to arrange each layout and send control commands to the internal units of the video module 450 via control line 448. Example commands may include which video images to display, the placement of each video image in the layout, demand to mirror an image, scale down or scale up images from certain sites, build or update a layout with a certain number of segments, etc. More information on the ILC 442 is disclosed in conjunction with FIG. 7.

Video module 450 may receive compressed video streams from the plurality of endpoints 330A-N, which are sent toward the MCU 400 via network 310 and processed by NI 420. Video module 450 may create one or more compressed CP video images according to one or more layouts that are associated with one or more conferences currently being conducted by the MCU 400.

An embodiment of the video module 450 may include one or more input modules 451A-X, one or more output modules 455A-X, and a video common interface 454. Input modules 451A-X may handle compressed input video streams from one or more participating endpoint 330A-N. Output modules 455A-X may generate composed compressed output of video streams of CP video images to one or more of the endpoints 330A-N.

The compressed output video streams may be composed from several input streams to form a video stream representing the conference for designated endpoints. The input streams may be modified. Uncompressed video data may be shared by the input modules 451A-X and the output modules 455A-X on a common interface 454, which may comprise any suitable type of interface, including a Time Division Multiplexing (TDM) interface, an Asynchronous Transfer Mode (ATM) interface, a packet based interface, and/or shared memory. The data on the common interface 454 may be fully uncompressed or partially uncompressed. The operation of an example video module 450 is described in U.S. Pat. No. 6,300,973.

Each input module 451A-X may comprise a decoder 452 for decoding the compressed input video streams. In one embodiment, each input module 451A-X may also comprise an Interaction Detector Component (IDC) 453. In an alternate embodiment, there may be one IDC 453 for all input modules 451. An embodiment of an IDC 453 may detect the ROI and/or relative position of an ROI in a video image. IDC 453 may detect interaction between different sites 330A-N. The IDC 453 may inform the ILC 442 on the detected information from the different input video streams. The information may be sent via the control line 448.

From time to time, periodically, and/or upon receiving a command from the ILC 442 an embodiment of the IDC 453 may capture, sample, and analyze data outputted by the decoder 452. An embodiment of the IDC 453 may be adapted to analyze the decoded video image received from an associated endpoint 330 and define the coordinates of one or more ROIs and/or their relative location in the video image. The analysis of the IDC 453 may further be used for determining interaction between different endpoints.

The detection may be done according to one or more different detection techniques, motion detection, flesh tone detectors, audio energy indication of audio signal received from a plurality of microphones located in the same room, face detectors, or different combination of different detectors. The indication of the audio signals may be received from the audio module 430. The IDC 453 may output detected information to the ILC 442 via control line 448. More information on the IDC 453 operations is disclosed in conjunction with FIG. 5.

In one embodiment, there is one video input module 451 for each of the endpoints 330A-N. Similarly, the video module 450 may include one video output module for each of the endpoints 330A-N. Each output module 455 may comprise an editor module 456. The editor module 456 may receive information and/or control commands from the ILC 442. Each video output module 455 may produce a screen layout that is individualized to a particular endpoint of the plurality of endpoints 330A-N. Each video output module 455 may further comprise an encoder 458 that may encode the output video stream. In another embodiment one output video 455 module may serve a plurality of the endpoints 330A-N or even all of the endpoints 330A-N that participate in the conference.

Video data from the input modules 451A-X may be received by the appropriate output modules 455A-X from the common interface 454, according to commands received from the ILC 442.

The editor 456 may modify, scale, crop, and place video data of each selected conferee into an editor frame memory, according to the location and the size of the image in the layout associated with the composed video of the CP image. The modification may be done according to instructions received from ILC 442. The instruction may take into account the identified interaction between endpoints and the identified ROI location in an image. Each rectangle (segment, window) on the screen layout may contain a modified image from a different endpoint 330.

When the editor frame memory is ready with all the selected modified conferee's images, the data in the frame memory is ready to be encoded by encoder 458. The encoded data video stream may be sent toward its associated endpoint 330. The composed encoded and compressed CP output video streams may be sent to the NI 420 via the video line 424. The NI 420 may transfer the one or more CP compressed video streams to the relevant one or more endpoints 330A-N.

In an alternate embodiment, a relay MCU 320 is implemented and the endpoint 330 is capable of building a CP video image to be displayed on it. In such embodiment, an ILC 442 may be capable of providing commands to the endpoints 330A-N themselves. One embodiment of a relay MCU is disclosed in a U.S. patent application Ser. No. 12/542,450, the content of which is incorporated herein by reference in its entirety for all purposes. In such an embodiment, the size, in pixels for example, of the ROI of each image and the interaction between segments in the layout is sent to the endpoint 330 with a request to the endpoint 330 to present a layout such that a certain number of segments with certain segments size will be displayed, the placement of each segment, any modification to an image, etc. Such communication with the endpoint may be out of band, over an Internet Protocol (IP) connection, for example. In other embodiments, the communication may be in band, for example as part of the predefined header of the payload of an RTP packet, or FECC.

In yet another embodiment of a relay MCU 400, the IDC 453 and/or the AIDC 437 may be embedded within an endpoint 330 in front of the encoder of the endpoint 330. The relative location information may be sent to the ILC 442 at the MCU 400 via the network 310 and the NI 420 as a payload of a detected packet. In such an embodiment, the ILC 442 may send layout instructions to an editor in the endpoint 330. The editor in the endpoint 330 may compose the CP layout and present it over the endpoint display unit.

In another embodiment of a relay MCU 400, each endpoint 330A-N may have an IDC 453 after its decoder and an ILC 442 in the endpoint control unit. The IDC 453 of the endpoint may send information on the relative location of the ROI in each decoded image, to the ILC module 442 in the endpoint. The ILC 442 may determine the layout and instruct the endpoint editor to compose it accordingly. In such a relay MCU 400, each endpoint 330A-N may control its layout as a stand-alone unit. The location of the IDC 453, AIDC 437, and ILC 442 may vary from one embodiment to another.

Common functionality of various elements of video module 450 that is known in the art is not described in detail herein. Different video modules are described in U.S. patent applications Ser. No. 10/144,561; Ser. No. 11/684,271; Ser. No. 11/751,558; and Ser. No. 12/683,806; U.S. Pat. No. 6,300,973; and International Patent Application Serial No. PCT/IL01/00757, the contents of which are incorporated herein by reference in their entirety for all purposes. The control buses 444, 448, 446, the compressed video bus 424, and the compressed audio bus 422 may be any desired type of interface including a Time Division Multiplexing (TDM) interface, an Asynchronous Transfer Mode (ATM) interface, a packet based interface, and/or shared memory.

Figure 5:
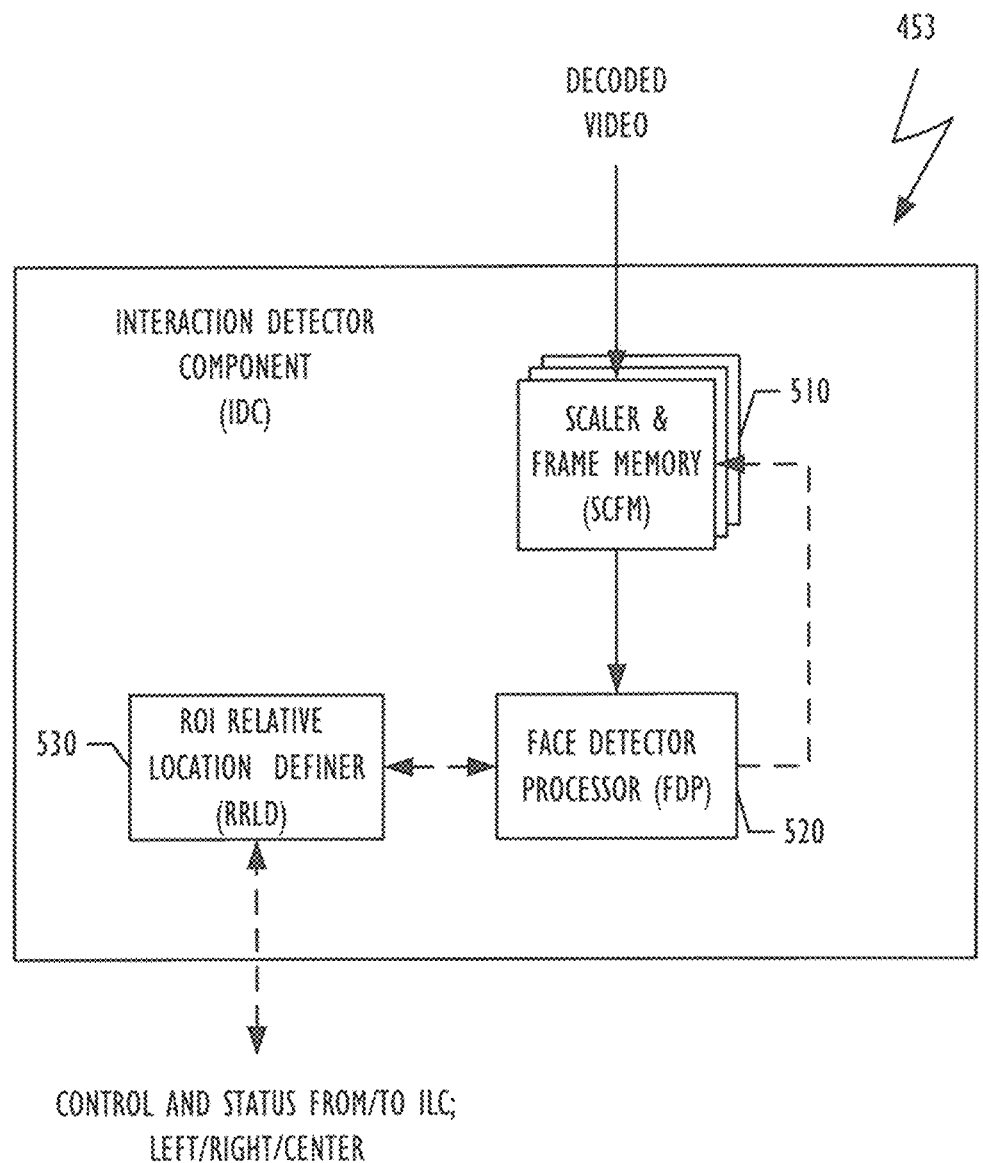
FIG. 5 illustrates a block diagram with relevant elements of an Interaction Detector Component (IDC), according to one embodiment.

FIG. 5 illustrates a block diagram with some elements of an Interaction Detector Component (IDC) 453 according to one embodiment. IDC 453 may be used to detect interaction between presented sites including interactions between two or more sites that are dominant in the conference; the placement/relative location of a person or persons in a video image; the direction the person or persons are facing, etc. An IDC 453 may include a scaler and one or more frame memory (SCFM) modules 510, a face detector processor (FDP) 520, and an ROI relative location definer (RRLD) 530. The face detector processor (FDP) 520 may be implemented on a DSP that is adapted to execute a known face detector technique such as provided by SHORE, the VeriLook SDK, or OpenCV. In an alternate embodiment, the FDP 520 may be implemented in hardware with face detection capabilities, including a DM365 from Texas Instruments. In one embodiment utilizing a centralized architecture, IDC 453 may be embedded in an MCU 400. In such an embodiment, IDC 453 may be part of the video unit 450, as described above, and may get the decoded video data from the relevant input modules 451A-X. In an alternate embodiment, the IDC 453 may be a part of each of the input modules 451A-X and collects the decoded video from its associated decoder 452.

In yet another embodiment, the IDC 453 may be embedded within an endpoint 330A-N. In such an endpoint, the IDC 453 may be used to determine the ROI and the relative location of the ROI in a video image that is generated by the endpoint 330. The IDC 453 may be associated with the input of an encoder of the endpoint 330 (not shown in the drawings). The IDC 453 may sample a frame of a video image from a frame memory used at the input of the encoder of the endpoint. The indication on the ROI and/or indication on relative location of the ROI may be transferred to the ILC 442 via the NI 420. The indication may be sent in dedicated packets that comply with a proprietary protocol or by adding the information to a standard header. In an alternate embodiment the information may be sent as a DTMF signal using a predefined string of keys, etc. The ILC 442 may use the information on the ROI (region of interest) to determine how to adapt the next CP layout.

In the embodiment of FIG. 5, the ROI relative location definer (RRLD) 530 may receive a command from the ILC 442. Example commands may detect and define an ROI, detect and define the relative location of an ROI at a site, etc. The ILC 442 may decide in which sites to search for an ROI and/or the relative location of an ROI according to different parameters, including audio signal strength, manual commands to change layout, information on a new site that has joined, etc. The RRLD 530 may send a command to the face detector processor (FDP) 520 to find and determine an ROI based on the location of the ROI. The RRLD 530 may calculate the relative location (left, right, or center of the image) of an ROI in a frame of a video image received from a certain site.

The FDP 520 may command the SCFM 510 to sample a frame of a decoded video image from a relevant site. The decoded video image may be fetched by the SCFM 510 from the common interface 454 or from the decoder 452 of the input module 451A-X that is associated with the site. The SCFM 510 may then scale down the video image according to the requirements of the FDP 520, and save the result in a frame memory.

A loop between FDP 520 and SCFM 510 may occur in one embodiment. The FDP 520 may request the SCFM 510: to scale down an image again, to scale up an image, and/or to fetch another sample, etc. This loop may be limited to a predefined number of cycles. At the end of the cycle, the FDP 520 may transfer information on the ROI to the RRLD 530. In case that no ROI was found, a message (such as no ROI, for example) may be sent to the RRLD 530. The RRLD 530 may output the detected information on the relative location to the ILC 442 via control line 448. In yet another embodiment the IDC 453 may transfer the location of the ROI coordinates in pixels from top left, for example, to the ILC 442 and the ILC 442 may calculate the relative location (left, right or center)

Another embodiment of IDC 453 may comprise other modules for determining the location of the ROI in a video image, using techniques that include motion detectors, flesh tone detectors, and/or different combination of different detectors. Some embodiments (not shown in the drawings) that are based on motion detectors may include one or more filters such as band-pass filters, low-pass filters or notch filters to remove interference motions such as clocks, fans, monitors, etc. Other embodiments may process the audio energy indication received from a plurality of microphones. A person who wishes to learn more on the different ROI detectors may read U.S. patent application Ser. No. 11/751,558; U.S. patent application Ser. No. 12/683,806; or visit www.consortium-.ri.cmu.edu/projOmega.php or www.consortium.ri.cmu.edu/projFace.php.

In some embodiments, a motion detector may be used for determining the ROI. In one embodiment, the motion detector may subtract two consecutive frames in order to define a region with changes. In videoconferencing, changes are typically due to movement of the heads, hands, etc. An ROI may be defined as a larger rectangular surrounding the area that differs between two consecutive frames. The consecutive frames may be stored in the one or more SCFMs 510.

In some embodiments of IDC 453, other techniques may be used for defining the interaction between different sites. For example, audio energy indications received from each site may be processed by an audio module 430 and information sent to IDC 453. The process may follow the interaction between the speakers along a period of time. If the interaction is a vocal interaction between dominant sites then those two sites can be considered dominant sites. The images from the two dominant sites may be placed on the upper row facing each other as in layout 200 images 120 and 130. In this embodiment, the IDC 453 may receive the information on the audio energy from the audio module 430, and/or from the control module 440.

In one embodiment, in which a site has a plurality of microphones; the location of the speaker in the room and the ROI of those images may be determined by processing the audio energy received from the plurality of microphones to determine the relative location of a speaker in the room. In some embodiments, the ROI and/or ROI relative location detector may reside in the endpoint 330 and the relative location of the ROI may be transmitted with the video image in a proprietary message or header.

Communication between the RRLD 530 and the control module 440 may depend on the architecture used. For example, if the IDC 453 is embedded within a video unit 450 of MCU 400, the communication between the RRLD 530 and the control module 440 may be implemented over the control line 448 connecting the control module 440 with the video module 450.

Alternatively, in an embodiment in which IDC 453 is located at an endpoint 330A-N while the control module 440 is located at the MCU 400, the communication may be implemented out of band or in band. Out of band communication may be handled via a connection between the endpoints 330A-N and the MCU 400 over an Internet Protocol (IP) network. If the multimedia communication with the endpoint 330 is over a packet switched network, the communication between IDC 453 (at the endpoint 330) and control module 440 may be implemented using a predefined header of the payload of a Real-time Transport Protocol (RTP) video packet. In such an embodiment, the coordinates of the ROI and/or relative location of an ROI as well as the sampling command may be embedded within the predefined header of the payload of the RTP video packet. Other embodiments may use DTMF and/or FECC channels.

If communication between IDC 453, at the endpoint 330 boldface, and control module 440 is via multimedia communication, as described above, the network interface (NI) 310 may be adapted to parse the received information and retrieve the coordinates of the ROI and/or relative location of an ROI received from IDC 453. The NI 310 may deliver the information to the control module 440 over a control bus 446 that connects the control module 440 and the NI 420. The NI 420 may be adapted to receive sampling commands, process them according to the communication technique used, and send them via the network 310 to the IDC 453.

Based on the results, an ILC 442 according to one embodiment may design an updated layout taking into account the detected ROI and/or its relative interaction and relative location. Instructions how to build the updated layout may be transferred to the relevant editors 456. The editors 456, according to the updated layout, may place in the left segments sites in which the conferees are sitting in the left section of the room, and vice versa, as illustrated in FIG. 2, in which segment 112 is allocated to the site B with the conferee 130. While the segment 114 is allocated to site C having the conferee 120 sitting in the right section of the image.

In some cases in which conferees in different sites are sitting in the same relative location (left or right to the center of the room) then the ILC 442 may send commands to the relevant editors 456 to mirror one or more of the images. In one embodiment, mirroring the image may be performed while building the CP layout, by reading the video data from the right edge the left edge of each row, and writing the video data from left to right from the left edge of the appropriate row in the relevant segment in the CP layout. The location in the layout may be dynamically changed when another site becomes dominant instead of one of the previous dominant sites.

In yet an another embodiment, one RF tracker may be used by the RRLD 530 to define the relative location of a subscriber in the room. The signal may be received by two or more antennas located in the room that is associated with the endpoint 330. The received RF signals may be processed by the endpoint 330 and information may be transmitted with the video image in a proprietary message or header.

Figure 6:
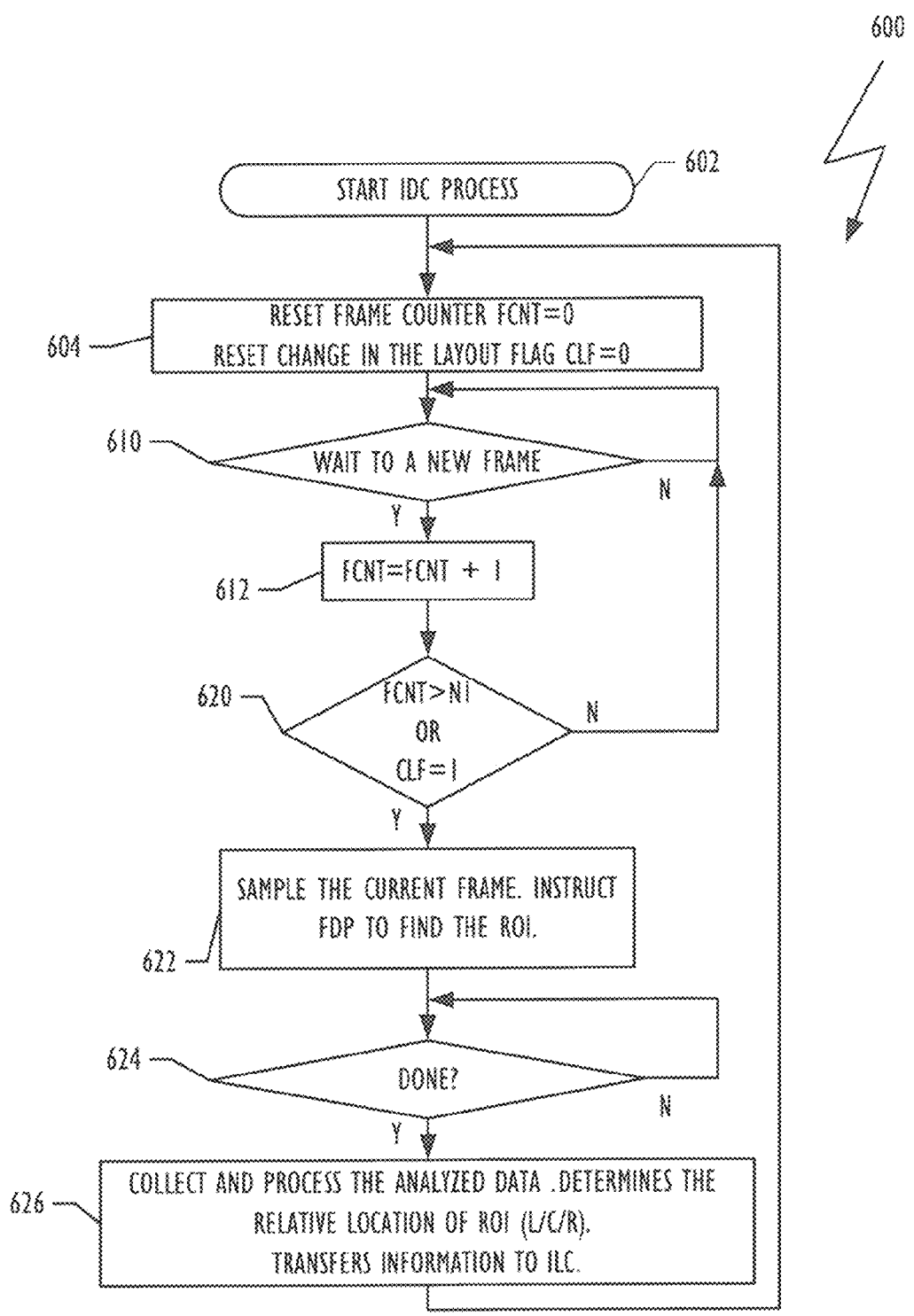
FIG. 6 illustrates a flowchart for a technique of defining interaction between sites in the different sites in a videoconferencing system, according to one embodiment.

FIG. 6 illustrates a flowchart for a technique 600 according to one embodiment that may be executed by an IDC 453. Technique 600 may be used for defining regions of interest (ROI) and its relative position in a video image. Technique 600 may be initiated in block 602 upon initiating of a conference. After initiation, technique 600 may reset in block 604 a frame counter (Fcnt) and a change-layout flag (CLF). In one embodiment, a frame counter (Fcnt) may count the frames at the output of an input module 451A-X. The change-layout flag (CLF) value may be 0 or 1. The CLF value equals 1 if a change in a layout indication was received from ILC 442. The change indication may include information on the new layout, information on the presented conferees and their associated input and output modules (451A-X and 455A-X respectively). The ILC 442 may request the RRLD 530 to search for an ROI and its relative position in the site's image. A change in the layout may occur as result of a change in audio signal strength, management requests, a new conferee, etc. The CLF value equals 0 if no change in a layout has been indicated. In some embodiments, the CLF may be set arbitrarily from the CM 440 or from one of the conferees by using the click-and-view function.

Next, technique 600 may wait in block 610 to receive a new frame. If in block 610 a new frame is not received in the waiting period, technique 600 returns to block 610. If in block 610 a new frame is received, then technique 600 may proceed to block 612 and increment the Fcnt by one. Next, block 620 determines whether the Fcnt value is greater than a predetermined value N1 or if the CLF value equals 1. In one embodiment, N1 may be a configured number in the range 1-1000. If in block 620 the Fcnt value is not greater than N1, and the CLF value equals 0, then technique 600 returns to block 610. If in block 620 the Fcnt value is greater than N1, and/or CLF value equals 1, then technique 600 may proceed to block 622. In one embodiment, a timer may be used instead or in addition to Fcnt. The timer can be set to any desired period of time, for example a few seconds or a few minutes.

At block 622, the technique 600 may instruct the FDP 520 to search and define an ROI. The technique 600 waits in block 624 until FDP 520 defines an ROI or informs the IDC 453 that no ROI has been found. Once the FDP outputs an ROI message, the technique 600 proceeds to block 626 to collect and process the analyzed data from the FDP 520. Block 626 may determine the existence of an ROI, its size, location (in pixels from top left, for example), and its relative location in the image (right, left, or center for example). In an alternate embodiment, if an ROI is not found, the value of N1 may be reduced in order to accelerate the following ROI search.

Technique 600 may act as an application program interface (API) between the FDP 520 and the ILC 442. The results may be transferred in block 626 to the ILC 442, and technique 600 may return to block 604. In some embodiments, technique 600 may repeat blocks 622 to 626, checking that the results are similar and if they are, transferring an average ROI and ROI relative location to the ILC 442.

Figure 7A:
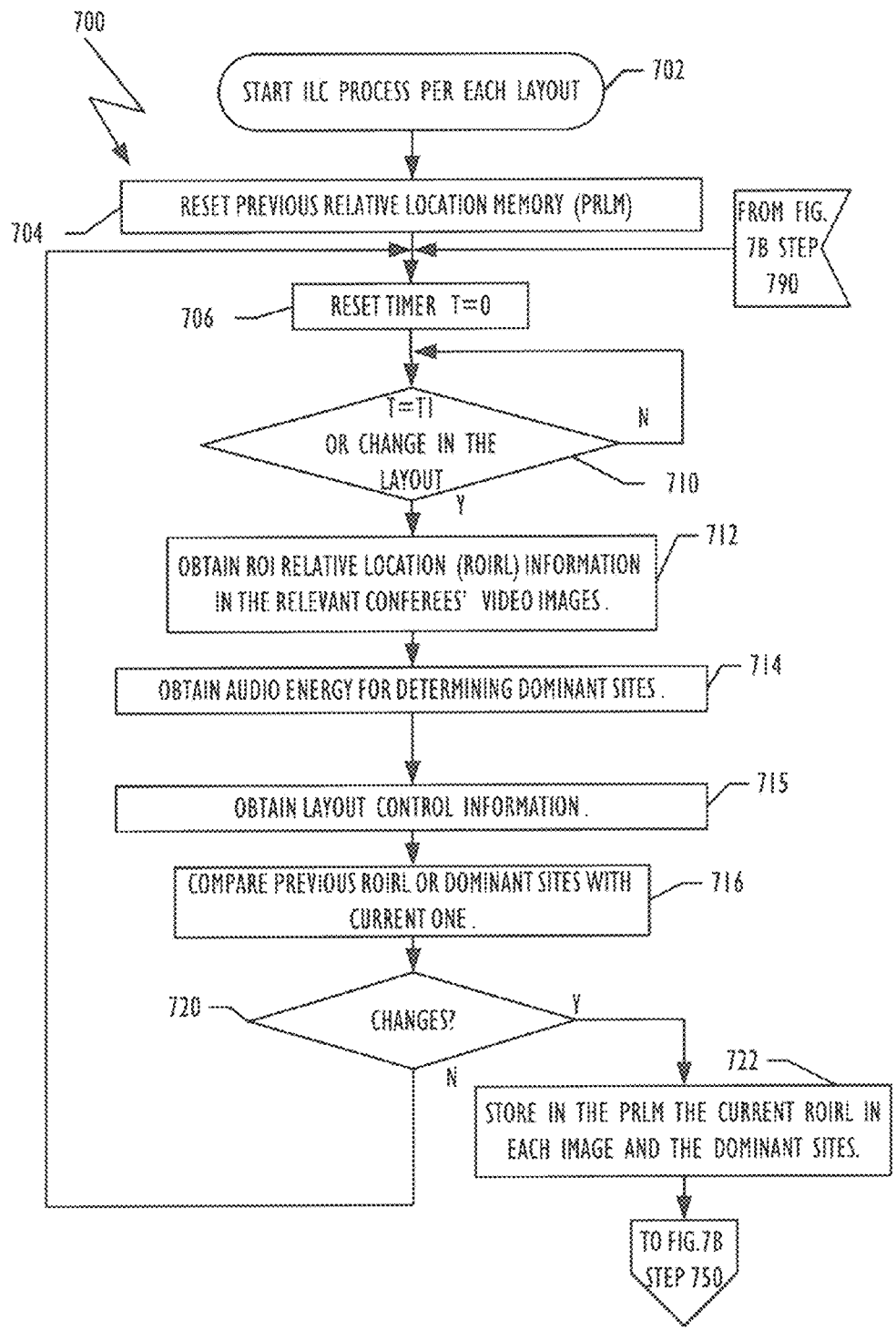
FIGS. 7A and B illustrate a flowchart for a technique of automatically and dynamically adapting one or more CP layouts, according to one embodiment.

FIG. 7A illustrates a flowchart for one embodiment of a technique 700 for automatically and dynamically adapting one of the layouts that is used in a video conference. In one embodiment, if more than one layout are involved, parallel tasks may be initiated one per each layout of CP image. In another embodiment, technique 700 may be run repeatedly, one cycle per each layout that is used in the session. Technique 700 may be initiated in block 702 by an ILC 442 and/or by the RRLD 530 (FIG. 5). At initiation, technique 700 may reset in block 704 a Previous-Relative-Location memory (PRLM). The PRLM may be used for storing information on the previously found relative position of an ROI to determine the differences with the current relative position of the ROI. Next, technique 700 may reset in block 706 a timer (T) and wait in block 710 for the timer T value to equal T1. In one embodiment, T1 may be in the range of a few hundreds of milliseconds to a few seconds. In another embodiment, frames of the composed CP image may be counted and be used instead of time. Once timer T value equals T1 and/or a change in a layout has occurred, technique 700 may proceed to block 712. Changes in a layout may occur when an additional conferee has joined the conference, a presented site needs to be replaced due to changes in the audio energy of the different conferees, etc.

At block 712, technique 700 may collect information on the ROI relative location (ROIRL) information in the relevant conferees' video images. The relevant conferees' video images are the video images that were selected for presentation in a layout. Next, audio energy information may be obtained in block 714 per each presented site. Using the audio information, two dominant sites may be detected, and/or more information on interaction between different endpoints may be detected, etc. Management and control information may be obtained in block 715. The management and control information may include preferences of a receiving conferee (the one that will observe the composed CP image), and information such as a forced conferee (a conferee that must be presented in the CP image, independent of its audio energy). Per each presented conferee image, technique 700 may calculate in block 716 the differences between the current received ROIRL and the previous ROIRL (saved in PRLM memory). Technique 700 may also determine in block 716 if there are differences in the dominant sites.

A decision is made in block 720 whether there is a significant change in the current ROIRL versus the previous ROIRL and/or if there are significant changes in the dominant sites. A significant change may be a pre-defined delta in pixels, percentages, audio strength, etc. In one embodiment, a significant change may be in the range of 5-10%. If in block 720 there is a significant change then technique 700 may store in block 722 the current ROIRL and dominant sites in the PRLM. Technique 700 may then proceed to block 750 in FIG. 7B. If in block 720 there is no significant change then technique 700 may return to block 706.

Figure 7B:
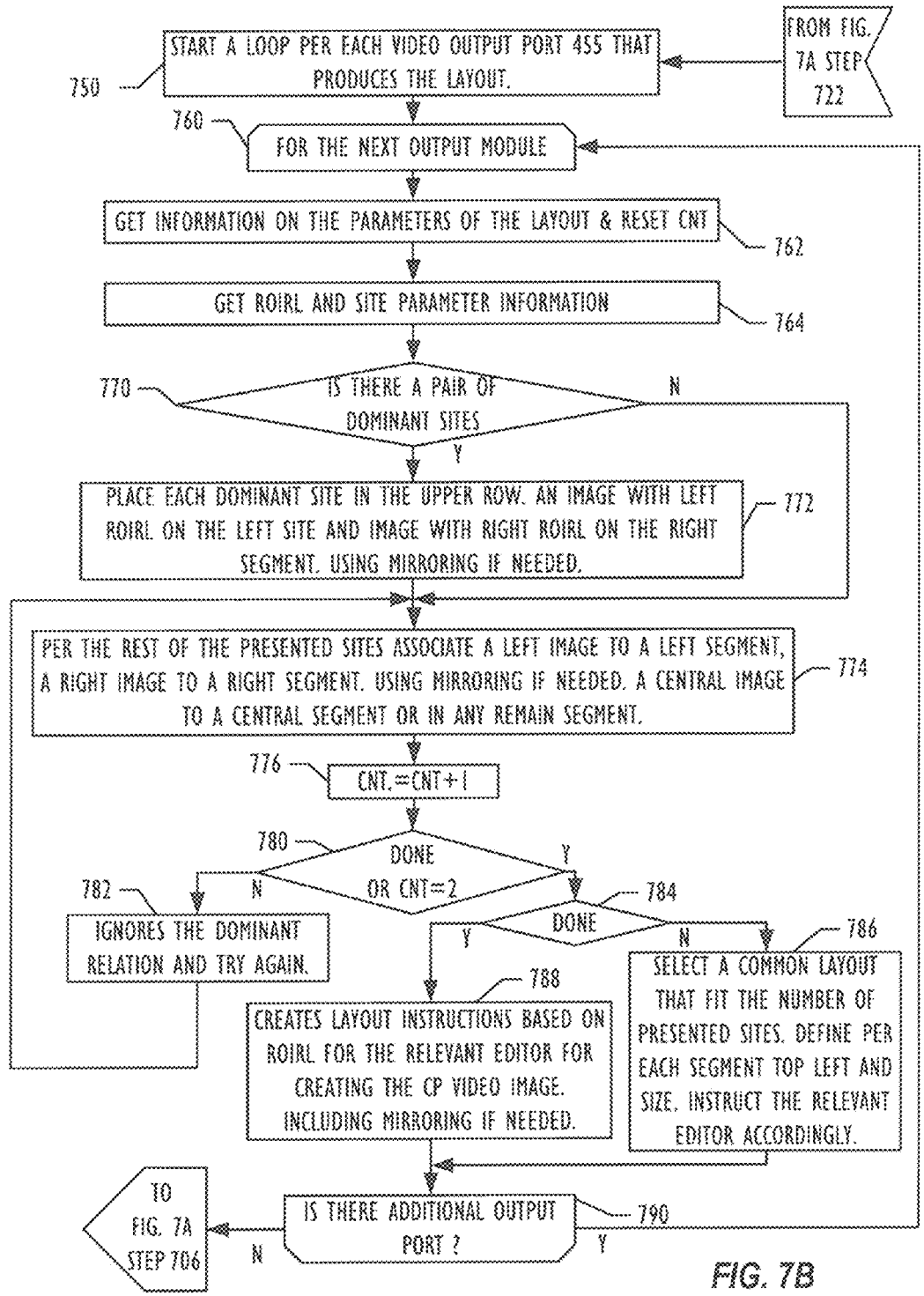

Referring now to FIG. 7B, in block 750, a loop may be started in blocks 760-790 for each output module 455A-X that executes the same layout that is designed by technique 700. Beginning in block 760, for each output module 455A-X, technique 700 may fetch in block 762 information on parameters related to the CP layout associated with the current output module. The parameters in one embodiment may include the layout size in number of pixels width and height (W×H), the layout format (2×2, 3×3, etc), which sites have been selected to be presented based on management decision and/or audio energy, etc. Technique 700 may also reset in block 762 a counter (Cnt) that will count the number of trials.

Next technique 700 may get in block 764 the ROIRL (ROI relative location) information and parameters for each of the sites that were selected to be presented in the adaptive layout of the relevant output module 455A-X. The information may be fetched from the PRLM in one embodiment. In one embodiment, the parameters may include the number of pixels of the ROI (height and width of the ROI), the relative location of the ROI, the dominant sites, the interaction between the sites, etc. Using the fetched information, technique 700 may determine in block 770 if there is a pair of dominant sites. If there is no pair of dominant sites, then technique 700 may proceed to block 774. If there is a pair of dominant sites then technique 700 may proceed to block 772.

In block 772, the dominant sites may be placed in the upper row of segments in the layout that will be presented in one embodiment. In alternate embodiments, they may be placed in the lower row, or elsewhere as desired. A dominant video image with an ROIRL on the left side may be placed in block 772 in a left segment of the layout. The dominant video image with an ROIRL on the right side of the video image may be placed in a right segment of the layout in block 772. If both dominant sites have the same ROIRL (either both are left or both are right), then one of the dominant sites may be mirrored in block 772. If both dominant sites have images at the center, then they may be placed side by side.

Other sites that have been selected to be presented may be placed in block 774 such that: video images with an ROIRL on the right side may be placed on the right, video images with an ROIRL on the left side may be placed on the left, and video images with an ROIRL in the center may be placed in the center or in remaining places, etc. If there are one or more selected sites that cannot be placed in the remaining segments, technique 700 may mirror them in block 774 and place them accordingly. Next, counter (Cnt) may be incremented in one in block 776.

In block 780 a decision may be made whether the Cnt value equals 2 or if the procedure of block 774 has completed successfully, so that all selected conferees may be presented in an appropriate relative location of the layout. If these conditions are not met, technique 700 may ignore in block 782 the dominant sites placement requirements that were determined in block 772, and may retry placing all of the selected sites in block 774. If in block 780 the Cnt value equals 2 or if the procedure of block 774 has completed successfully, technique 700 may proceed to block 784.

In block 784, a decision may be made whether the procedure of block 774 has completed successfully. In one embodiment, "successfully" may mean that all sites that were selected for viewing were placed such that they are all facing the center of the layout. If the conditions of block 784 are not met, technique 700 may ignore in block 786 the identified interaction, select a common layout that fits the number of sites to be displayed, and arrange the layout ignoring the ROIRL. If block 784 determines that the procedure of block 774 has completed successfully, technique 700 may create in block 788 instructions regarding the layout arrangement, so that the presented sites are looking to the center of the layout. The layout instructions may be sent in block 788 to the editor 456 in the appropriate output module 455A-X. In another embodiment, in block 786 the technique 700 may select one of the calculated layouts, which may present some interaction between conferees.

Next, the technique 700 may check in block 790 whether there are additional video output modules 455A-X that need to be instructed on their layout arrangement. If there are, then technique 700 may return to block 760. If there are not, then technique 700 may return to block 706 in FIG. 7A.

In the present disclosure, the words "unit," "device," "component," "module," and "logical module" may be used interchangeably. Anything designated as a unit or module may be a stand-alone module or a specialized or integrated module. A module may be modular or have modular aspects allowing it to be easily removed and replaced with another similar unit or module. Each module may be any one of, or any combination of, software, hardware, and/or firmware. Software of a logical module may be embodied on a computer readable medium such as a read/write hard disc, CDROM, Flash memory, ROM, etc. In order to execute a certain task a software program may be loaded to an appropriate processor as needed.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above-described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments along the discloser. The scope of the invention is limited only by the following claims and equivalents thereof.

While certain embodiments have been described in details and shown in the accompanying drawings, it is to be understood that such embodiments are merely illustrative of and not devised without departing from the basic scope thereof, which is determined by the claims that follow.

We claim:

1. A method, comprising:
    generating a continuous presence video image automatically for a first endpoint of a continuous presence videoconference responsive to an interaction between a plurality of conferees, comprising:
       determining automatically an interaction between a first conferee and a second conferee of the plurality of conferees;
       selecting a continuous presence video layout for the continuous presence video image;
       positioning a first video image corresponding to the first conferee in the continuous presence video image; and
       positioning a second video image corresponding to the second conferee relative to the first video image in the continuous presence video image, responsive to the interaction between the first conferee and the second conferee; and
    displaying the continuous presence video image at the first endpoint of the continuous presence videoconference.

2. The method of claim 1, wherein the act of generating a continuous presence video image further comprises:
    receiving content from an endpoint corresponding to the first conferee; and
    presenting the content in the continuous presence video image,
    wherein the act of positioning a first video image comprises:
       positioning the first video image on a first side of the content, and
    wherein the act of positioning a second video image comprises:
       positioning the second video image on a second side of the content.

3. The method of claim 1, wherein the act of generating a continuous presence video image further comprises:
    generating instructions for a first endpoint of the continuous presence videoconference for creating the continuous presence video image at the first endpoint responsive to the interaction between the first conferee and the second conferee;
    sending the instructions to the first endpoint of the continuous presence videoconference; and
    creating the continuous presence video image at the first endpoint responsive to the instructions.

4. The method of claim 1, further comprising:
    generating instructions for creating the continuous presence video image for the first endpoint; and
    sending the instructions for creating the continuous presence video image for the first endpoint to the first endpoint.

5. The method of claim 1, wherein the act of generating a continuous presence video image further comprises:
    modifying the first video image responsive to the interaction between the first conferee and the second conferee.

6. The method of claim 1,
    wherein determining automatically an interaction between a first conferee and a second conferee comprises:
       determining a dominant conferee of the plurality of conferees; and
       determining a non-dominant conferee of the plurality of conferees; and
    wherein positioning a first video image corresponding to the first conferee in the continuous presence video image comprises:
       positioning automatically a first video image corresponding to the dominant conferee in the continuous presence video image, and
    wherein positioning a second video image corresponding to the second conferee relative to the first video image comprises:
       positioning automatically a second video image corresponding to the non-dominant conferee relative to the first video image in the continuous presence video image.

7. The method of claim 1, wherein the act of generating a continuous presence video image further comprises:
    identifying a first relative location of a first region of interest within a first video image corresponding to the first conferee of the plurality of conferees;
    identifying a second relative location of a second region of interest within a second video image corresponding to the second conferee of the plurality of conferees; and
    wherein determining automatically an interaction between a first conferee and a second conferee comprises
       determining an interaction between the first conferee and the second conferee responsive to the first relative location of the first region of interest within the first video image and the second relative location of the second region of interest within the second video image.

8. The method of claim 1, further comprising:
    designating a conferee of the plurality of conferees at a first site as an active conferee;

copying an image of the active conferee from a video image received from the first site; and presenting the image of the active conferee and the video image received from the first site in the continuous presence video image.

9. A videoconferencing system, comprising:
a plurality of endpoints, comprising:
  a first endpoint, corresponding to a first conferee; and
  a second endpoint, corresponding to a second conferee; and
a layout controller adapted to generate a continuous presence video image responsive to an interaction between the first conferee and the second conferee, wherein the layout controller is adapted to:
  determine automatically an interaction between the first conferee and the second conferee;
  select a continuous presence video layout for the continuous presence video image;
  position a first video image corresponding to the first conferee in the continuous presence video image; and
  position a second video image corresponding to the second conferee relative to the first video image in the continuous presence video image, responsive to the interaction between the first conferee and the second conferee.

10. The videoconferencing system of claim 9, further comprising:
an editor module adapted to manipulate a first video image received from the first endpoint and a second video image responsive to the layout controller.

11. The videoconferencing system of claim 9, wherein the layout controller is further adapted to send instructions for displaying the continuous presence video image generated by the layout controller to the plurality of endpoints.

12. The videoconferencing system of claim 9, further comprising:
a video module adapted to encode the continuous presence video image responsive to the layout controller.

13. The videoconferencing system of claim 9, further comprising:
a video layout editor module, adapted to position in the continuous presence video image a first video image corresponding to the first conferee and a second video image corresponding to the second conferee relative to the first video image, responsive to the layout controller.

14. The videoconferencing system of claim 9, further comprising:
an interaction decoder, adapted to detect the interaction between the first conferee and the second conferee and to inform the layout controller of the interaction.

15. The videoconferencing system of claim 14, wherein the interaction decoder comprises a video interaction decoder adapted to identify a relative location of a region of interest in a first video image corresponding to the first conferee.

16. The videoconferencing system of claim 14, wherein the interaction decoder comprises an audio interaction decoder adapted to analyze audio energy and to inform the layout controller of the interaction responsive to the audio energy.

17. An apparatus for processing a first video image from a first endpoint corresponding to a first conferee in a continuous presence video conference and a second video image from a second endpoint corresponding to a second conferee in the continuous presence video conference, comprising:
a control module adapted to lay out a continuous presence video conference video image responsive to an interaction between the first conferee and the second conferee, wherein the control module is adapted to:
  determine automatically an interaction between the first conferee and the second conferee;
  select a continuous presence video layout for the continuous presence video image;
  position a first video image corresponding to the first conferee in the continuous presence video image; and
  position a second video image corresponding to the second conferee relative to the first video image in the continuous presence video image, responsive to the interaction between the first conferee and the second conferee; and
a first video module adapted to create the continuous presence video conference video image laid out by the control module.

18. The apparatus of claim 17, further comprising:
an interaction decoder, adapted to detect the interaction between the first conferee and the second conferee and to inform the control module of the interaction.

19. The apparatus of claim 18, wherein the interaction decoder is a video interaction decoder, adapted to identify a relative location of a region of interest in the first video image.

20. The apparatus of claim 18, wherein the interaction decoder is an audio interaction decoder, adapted to analyze a first audio energy corresponding to the first conferee and a second audio energy corresponding to the second conferee.

21. The apparatus of claim 17, wherein the first video module is associated with the first endpoint.

22. The apparatus of claim 17, further comprising:
an editor module adapted to manipulate the first video image responsive to the control module.

* * * * *